(12) United States Patent
Chaurushia et al.

(10) Patent No.: US 6,607,573 B1
(45) Date of Patent: *Aug. 19, 2003

(54) PORTABLE AIR POLLUTION CONTROL APPARATUS

(75) Inventors: Ashok Chaurushia, Claremont, CA (US); Steve Odabashian, Hawthorne, CA (US); Arnold Comproni, Sylmar, CA (US); Jorge Millan, Hawthorne, CA (US)

(73) Assignee: Northrop Grumman Corporation, Los Angeles, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/795,626

(22) Filed: Feb. 6, 1997

(51) Int. Cl.[7] .............................................. B01D 35/30
(52) U.S. Cl. .............................. 55/356; 55/467; 55/486
(58) Field of Search ........................ 55/356, 467, 471, 55/486, 385.2, 472, 473

(56) References Cited

U.S. PATENT DOCUMENTS

| | | | |
|---|---|---|---|
| 2,347,728 A | | 5/1944 | Bell .............................. 183/107 |
| 4,163,650 A | * | 8/1979 | Watson et al. ................. 55/356 |
| 4,218,963 A | | 8/1980 | Burnetter ....................... 98/115 |
| 4,245,551 A | | 1/1981 | Berkmann .................... 98/115 |
| 4,350,504 A | * | 9/1982 | Diachuk ........................ 55/466 |
| 4,354,451 A | | 10/1982 | Vohringer et al. ........... 118/326 |
| 4,378,728 A | | 4/1983 | Berkmann .................... 98/115 |
| 4,450,900 A | * | 5/1984 | Nathan ......................... 55/356 |
| 4,512,245 A | * | 4/1985 | Goldman ...................... 55/356 |
| 4,590,884 A | | 5/1986 | Kreeger et al. .............. 118/308 |
| 4,662,309 A | | 5/1987 | Mulder ......................... 118/312 |
| 4,664,060 A | | 5/1987 | Roberts ........................ 118/326 |
| 4,695,299 A | * | 9/1987 | Spadaro et al. ............... 55/356 |
| 4,723,971 A | * | 2/1988 | Caldas ......................... 55/356 |
| 5,061,510 A | | 10/1991 | Nussbaumer et al. ......... 427/28 |
| 5,103,760 A | | 4/1992 | Johnson ....................... 118/309 |
| 5,107,756 A | | 4/1992 | Diaz ............................ 454/53 |
| 5,244,499 A | | 9/1993 | Mazakas ..................... 118/309 |
| 5,245,763 A | | 9/1993 | Neikter ........................... 34/22 |
| 5,267,371 A | * | 12/1993 | Soler et al. ................... 55/356 |
| 5,281,246 A | * | 1/1994 | Ray et al. ..................... 55/356 |
| 5,305,494 A | | 4/1994 | Candler ........................ 15/304 |
| 5,326,599 A | | 7/1994 | Shutic .......................... 427/478 |
| 5,393,345 A | | 2/1995 | Smith .......................... 118/312 |
| 5,397,394 A | | 3/1995 | Orr ............................. 118/634 |
| 5,591,244 A | * | 1/1997 | Vross et al. .................. 55/356 |
| 5,688,297 A | | 11/1997 | Spengler ...................... 55/356 |

FOREIGN PATENT DOCUMENTS

JP          4-298212    * 10/1992   .................. 55/467

* cited by examiner

Primary Examiner—Robert A. Hopkins
(74) Attorney, Agent, or Firm—Stetina Brunda Garred & Brucker

(57) ABSTRACT

An air pollution control apparatus usable for capturing airborne pollutants present in a relatively confined environment. The apparatus is a portable airborne-pollutant capturing device movable to a site of pollutant origin and having at least one airborne-pollutant collector member, a vacuum system, and a filter system. The filter system can include one filter or more than one identical or different filters chosen for enhanced filtration capabilities in relation to pollutants present. Preferably, more than one type of filter can be accommodated simultaneously to thereby capture multiple pollutants. Fugitive particulate is captured by positioning the airborne-pollutant collector member proximate the activity causing pollution, and operating the collector member simultaneously with the polluting activity to thereby cause particulate to be captured by the filter system.

6 Claims, 1 Drawing Sheet

PORTABLE AIR POLLUTION CONTROL APPARATUS

FIELD OF THE INVENTION

This invention relates in general to air pollution control equipment, and in particular to a portable airborne-pollutant capturing device movable to a site of pollutant origin for withdrawing therefrom pollutants and capturing the pollutants in an integral filter system.

BACKGROUND OF THE INVENTION

The danger of toxic emissions in confined spaces is well recognized in present day efforts to control airborne pollutants and their potential health hazards. One particularly well-defined example of this control is found in paint booths used for painting aircraft, vehicles, etc. These booths are closed and are designed to substantially encompass the article being painted, and painting proceeds as a spray coating. The booths are equipped with exhaust fans that draw airborne pollution from the booth for collection downstream. When an entire object is being painted, such a booth is highly efficient in protecting persons in the proximity of the painting activity.

While an entire object may be painted in a such a booth, the application of touch-up paint to only a portion of an object generally must be performed in a relatively open area without the protection of a booth or other walled environment. Consequently, dangerous airborne pollutants such as volatile organic compounds, chromium VI, and other components of paint can enter a relatively confined environment (e.g. the interior of a building) and be a safety hazard to people within that environment. Because it is not feasible to construct closed booths or the like for touch-up painting since such painting may be required at several random sites, fugitive particulate simply enters the relatively confined environment, thus either requiring protective apparel for those nearby or causing a health risk to unprotected personnel.

In view of potential health risks due to non-confinable airborne pollutants, it is apparent that a need is present for particulate capture in environments where individual well-being can be jeopardized. Accordingly, a primary object of the present invention is to provide an air pollution control apparatus movable to a site of pollutant origin.

Another object of the present invention is to provide an air pollution control apparatus having a filter system for trapping and retaining fugitive pollutants.

Yet another object of the present invention is to provide an air pollution control apparatus whose filter system can be customized for favorable efficiency with respect to pollutants to be captured.

These and other objects of the present invention will become apparent throughout the description thereof which now follows.

SUMMARY OF THE INVENTION

The present invention is an air pollution control apparatus usable for capturing airborne pollutants present in a relatively confined environment. The apparatus comprises a portable airborne-pollutant capturing device movable to a site of pollutant origin and having at least one airborne-pollutant collector member. A vacuum system is present within the capturing device and is in communication with the collector member to draw airborne pollutants into the capturing device through the pollutant collector member. Actual capture of pollutants is accomplished by a filter system within the capturing device. The filter system can include one filter or more than one identical or different filters chosen for enhanced filtration capabilities in relation to pollutants present. Thus, an activated charcoal filter may be included in the filter system for trapping and retaining volatile organic compounds (VOC's), a paint overspray filter may be included for general pollutant collection, while a high-efficiency particulate air (HEPA) filter is included to assure chromium VI and other metallic contaminates associated with paint. Preferably, more than one type of filter can be accommodated simultaneously to thereby capture multiple pollutants. Fugitive particulate is captured by positioning the airborne-pollutant collector member proximate the activity causing pollution (e.g. touch-up painting), and operating the collector member simultaneously with the activity to thereby cause particulate to be drawn within the airborne-pollutant capturing device and there captured by the filter system. In this manner airborne pollutant escape is significantly curtailed.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
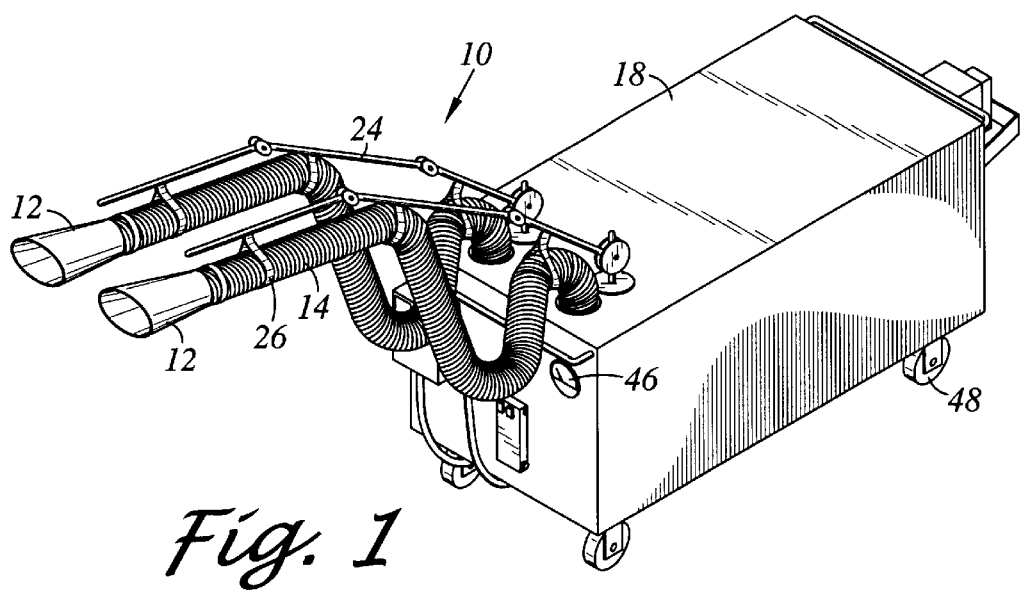
FIG. 1 is a perspective view of an air pollution control apparatus.
Figure 2:
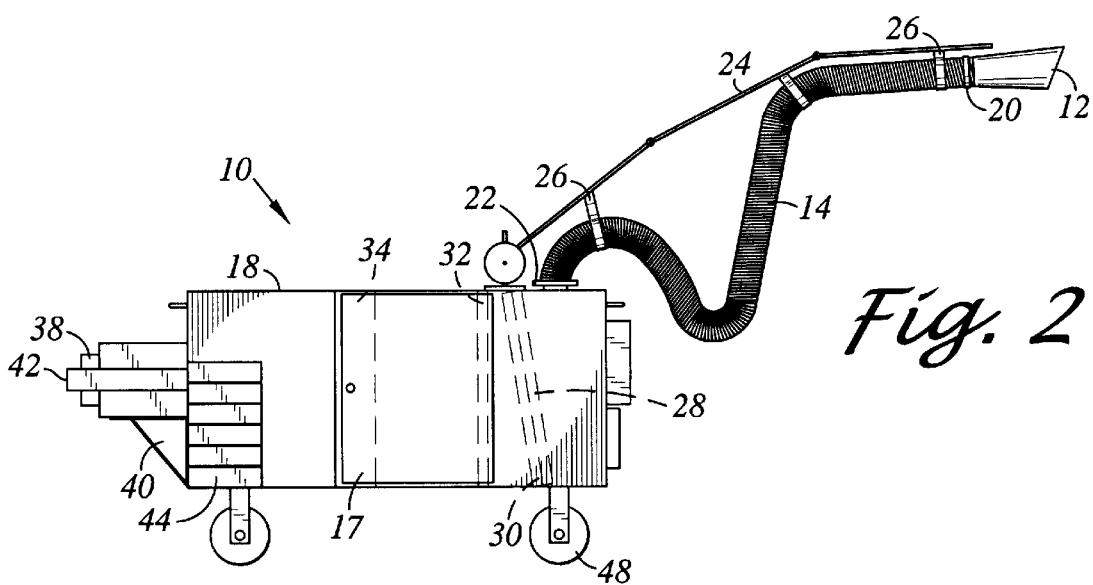
FIG. 2 is a side elevation view of the air pollution control apparatus of FIG. 1.
Figure 3:
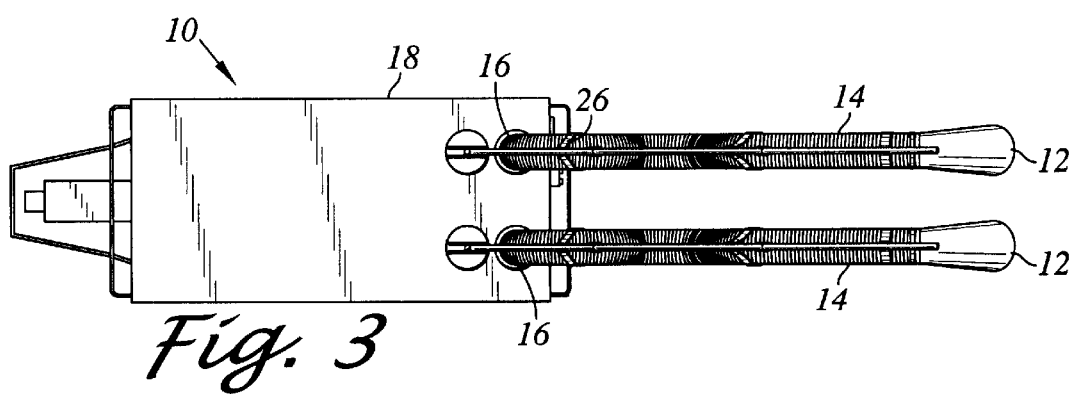
FIG. 3 is a top plan view of the apparatus of FIG. 1.

Referring to FIGS. 1–3, an air pollution control apparatus 10 is shown. The apparatus 10 has two cone hoods 12 of identical construction as airborne-pollutant collector members. Each hood 12 is in communication with a flexible hose 14 leading from the proximal end of the hood 12 to respective housing inlets 16 of the housing 18. Respective conventional clamps 20, 22 retain ends of each hose 14 to, respectively, each hood 12 and each housing inlet 16. An articulating external support 24 is associated with each hose 14 and connected thereto with a plurality of straps 26. A door 17 (shown in FIG. 2) closes and seals the housing 18 so that a pressure differential can be established to thereby draw air into the housing 18 through the cones 12.

Situated within the housing 18 are a plurality of filters for trapping and retaining fugitive pollutants. In particular, a primary filter 28 and secondary filter 30 are situated substantially immediately proximate from the housing inlets 16 to thereby be the first filters to receive aspirated intake through the hoods 12. The primary and secondary filters 28, 30 can be Ultra/OSM filters, or equivalent, as manufactured by ATI Technologies, Inc., Santa Ana, Calif., and are especially functional in capturing and retaining particulate matter greater than 10 microns in size. Disposed proximally from the primary and secondary filters 28, 30 can be an activated carbon filter 32 such as an IAQ-99 Filter as manufactured by Airguard Industries, Corona, Calif., especially useful in trapping volatile organic compounds through adsorption. Immediately proximate to the carbon filter 32 is a high efficiency particulate air (HEPA) filter 34 which can be as manufactured by Farr Co., Hawthorne, Calif., Catalog No. 242412, or equivalent. Employment of a HEPA filter 34 as a final destination of drawn pollutants helps to assure capture efficiency of the air pollution control apparatus 10.

Also disposed within the housing 18 is a vacuum system comprising a conventional fan (not shown) driven by an electric motor 38 supported by a bracket 40 and protected by a guard member 42. Slanted air louver vents 44 permit passage of exhaust air after passage through the filter system. A pressure differential gage 46 such as a Magnehlic Gage Model 2005C, or equivalent, manufactured by Dwyer Instruments, Inc., Michigan City, Ind., is provided to indicate filter efficiency and cleanliness as reflected by air flow for filter-replacement indication purposes. The pressure differential range should be between 1–10 inches of water depending on the type of filters. Mobility is provided by four standard wheel assemblies 48 each having a brake for stationery placement at a pollution site.

In operation, an operator moves the air pollution control apparatus 10 to a location of expected airborne-pollutant production, as can be non-limitedly exemplified by a spray paint touch-up site in an enclosed building where fugitive components of the paint represent anticipated particulate pollution. The cone hoods 12 are then positioned as close as possible to the paint application site, the control apparatus is activated, and paint application occurs. While an extremely high percentage of paint components are deposited on the surface being painted, a significant quantity of fugitive components such as chromium VI, as well as volatile organic compounds, are drawn within the hoods 12 for capture within the filter system. Because the filter system employs removable and changeable filters, a user can select specialized filters for specific expected particulate. Thus, for example, if pollutant particulate is best collected by adsorption on activated carbon, such carbon filters can be used extensively or exclusively within the housing 18 to customize and maximize pollution control.

Use of air pollution control apparatus here described and claimed can significantly help in maintaining environmentally safe work places while allowing a practical approach in manufacturing procedures. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A air pollution control apparatus for capturing airborne pollutants said device comprising:

a) a wheeled, single chamber mobile housing generally air-tight when in a closed configuration and having a generally non-obstructed linear flow path for incoming pollutant-containing air upon collection until initiation of filtration thereof, said housing hand movable while in operation within a space to at least one point source site within said space where pollution is originating, and having at least two flexible, extendably maneuverable airborne-pollutant collector members with each collector member having a dedicated articulatable exterior support structure and a distal end positionable at a point source site of pollutant origin;

b) a vacuum system within the mobile housing in communication with the at least two collector members to draw airborne pollutants into the mobile housing through said collector members and to a filter system; and c) a filter system comprising a plurality of removable filters within the mobile housing and to which airborne pollutants drawn into said housing from the collector member are delivered to be trapped and retained.

2. An air pollution control apparatus as claimed in claim 1 wherein a hood is attached to the distal end of the pollutant collector member.

3. An air pollution control apparatus as claimed in claim 2 wherein the filter system includes at least one activated carbon filter.

4. An air pollution control apparatus as claimed in claim 3 wherein the filter system includes at least one high efficiency particulate air filter.

5. An air pollution apparatus as claimed in claim 1 wherein the filter system includes at least one activated carbon filter.

6. An air pollution control apparatus as claimed in claim 1 wherein the filter system includes at least one high efficiency particulate air filter.

* * * * *